(12) United States Patent
Kraus et al.

(10) Patent No.: US 7,370,575 B2
(45) Date of Patent: May 13, 2008

(54) CROP RE-HYDRATION SYSTEM CARRIED BY A LARGE SQUARE BALER

(75) Inventors: Timothy James Kraus, Hedrick, IA (US); Walter Mark Schlesser, Ottumwa, IA (US)

(73) Assignee: Deere & Company, Moline, IL (US)

( * ) Notice: Subject to any disclaimer, the term of this patent is extended or adjusted under 35 U.S.C. 154(b) by 176 days.

(21) Appl. No.: 11/152,908

(22) Filed: Jun. 15, 2005

(65) Prior Publication Data

US 2006/0283167 A1    Dec. 21, 2006

(51) Int. Cl.
   *B30B 15/30*   (2006.01)
(52) U.S. Cl. .......................................... 100/73; 56/341
(58) Field of Classification Search ................. 56/341; 100/73
   See application file for complete search history.

(56) References Cited

U.S. PATENT DOCUMENTS

| | | | |
|---|---|---|---|
| 1,606,706 A * | 11/1926 | Johnston et al. | 180/9.38 |
| 3,585,730 A * | 6/1971 | Morse | 34/418 |
| 4,604,857 A | 8/1986 | Maher | |
| 4,873,722 A | 10/1989 | Tominari | |
| 4,884,529 A * | 12/1989 | Byrnes | 122/115 |
| 4,918,910 A * | 4/1990 | Sheehan et al. | 56/341 |
| 5,224,236 A * | 7/1993 | Sallquist | 15/321 |
| 5,406,779 A * | 4/1995 | Deutsch et al. | 56/32 |
| 5,758,479 A | 6/1998 | Staheli | |
| 6,925,793 B2 * | 8/2005 | Schlesser et al. | 56/341 |
| 6,978,740 B1 * | 12/2005 | Schlesser et al. | 122/406.3 |
| 7,162,950 B2 * | 1/2007 | McClure et al. | 100/8 |

* cited by examiner

*Primary Examiner*—Thomas B Will
*Assistant Examiner*—M. T. Nguyen

(57) ABSTRACT

Components of a crop re-hydration system are advantageously carried on free space of a large square baler. Specifically, a direct-fired steam generator is mounted at a rear location on the baler so as not to transfer heat to a hydraulic fluid supply tank located at a forward location on the baler. Further, the combustion chamber of the steam generator is coupled to a forwardly extending main steam conduit having a length sufficient for ensuring that the water injected into the combustion chamber is thoroughly mixed with hot combustion gases and changed to steam prior to reaching a steam distribution manifold located at a forward end of the baler. A combustion air intake filter is positioned in a relatively clean zone at an elevated location at the rear of the baler. Water tanks are mounted closely adjacent ground wheel axles of the baler so that the weight of the water does not unduly load the baler frame.

9 Claims, 2 Drawing Sheets

CROP RE-HYDRATION SYSTEM CARRIED BY A LARGE SQUARE BALER

FIELD OF THE INVENTION

The present invention relates to crop re-hydration systems used in conjunction with balers so as to treat crop to be baled with steam immediately prior to the baling operation, and more specifically relates to a re-hydration system that is carried by a baler for making large parallelepiped bales, such balers being commonly called large square or large rectangular balers.

BACKGROUND OF THE INVENTION

The practice of using steam to re-hydrate hay, or other crop, prior to baling, is discussed in U.S. Pat. Nos. 4,604,857, 4,873,772 and 5,758,479. The acceptance to date of such a harvesting practice has been low, and it is thought that this low acceptance is due to the lack of a fully-integrated machine for producing the steam, treating the crop with steam and processing the treated crop.

SUMMARY OF THE INVENTION

The present invention relates to a harvesting machine having an integrated crop re-hydration system including a steam generating and steam delivery arrangement.

An object of the invention is to provide a crop harvesting machine having a pick-up for elevating the crop into the machine for further processing and to provide a crop re-hydration system including a steam generating and steam delivering system which is integrated into the harvesting machine without adversely affecting the harvesting functions of the machine and/or without adding to the working width or length of the machine, and/or without adding appreciable loading to the vehicle frame.

The foregoing object is achieved by providing a large square baler having an integrated crop re-hydration system including a direct-fired steam generator having a combustion chamber and fuel supply mounted across a top rear location of the baler, by providing a driven air pump arrangement at one side just forward of the fuel supply, by mounting a steam delivery system at the pick-up and by providing a water supply source centered above the axle structure carrying tandem wheels at the opposite sides of the baler.

DESCRIPTION OF THE PREFERRED EMBODIMENT

Figure 1:
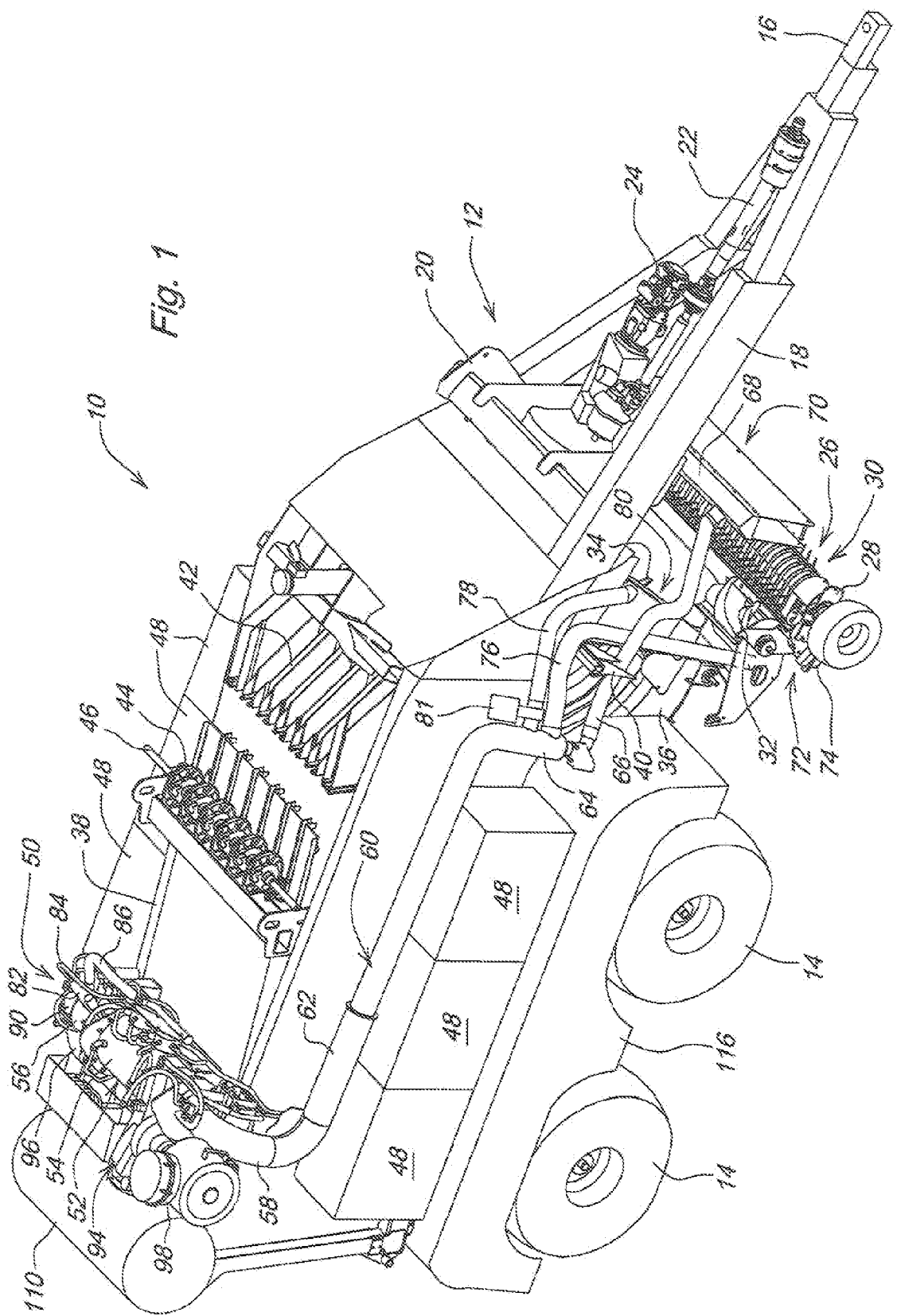
FIG. 1 is a schematic, right front perspective view of a large square baler incorporating a direct-fired steam generator and steam distribution system in accordance with the principles of the present invention, with parts being omitted for clarity and simplicity.

Referring now to FIG. 1, there is shown a large square baler 10 including a main frame 12 supported on a set of tandem wheels 14 for being towed across the ground by a tractor (not shown) coupled to a hitch 16 at a forward end of a draft frame 18 joined to, and extending forwardly from a cross beam structure 20 forming a forward end of the main frame 12. The towing tractor supplies power to the baler 10 by way of a power take-off shaft coupled to a drive line 22, which, in turn, is coupled to a transmission arrangement for driving a hydraulic pump arrangement, partially shown at 24, which is hydraulically coupled to various hydraulic cylinders and motors for driving all of the driven components of the baler 10. A hydraulic fluid reservoir and oil cooler arrangement (not shown) for supplying hydraulic fluid to the pump arrangement 24 is mounted to a forward location of the baler 10 just rearward of the cross beam structure 20.

Suspended from a forward location of the main frame is a crop gathering pick-up 28 including a frame 28 supporting a tined reel 30 operable for elevating a windrow of crop and delivering it to a pair of stub augers 32 (only one visible) operable for narrowing the stream of crop being fed, by a packer form assembly 34, into an inlet of a pre-compression chamber 36 which is curved upwardly and to the rear. The pre-compression chamber 36 defines an outlet at its upper end which registers with an inlet provided at a bottom wall of a fore-and-aft extending baling chamber 38. A stuffer fork 40 is selectively operable for moving a charge of pre-compressed crop from the pre-compression chamber 36 into the baling chamber 38. In a manner known in the art, charges of crop are intermittently compressed rearwardly in the baling chamber 38 by a plunger 42 mounted for reciprocating in a forward section of the baling chamber 38 so as to form a bale of compressed crop.

Once a bale of a pre-selected length is formed, it is bound together by a plurality of strands of twine through the action of a tying system including a twine-delivery needle assembly (not shown) including a plurality of needles mounted for being swung upwardly through the baling chamber 38 from a stand-by position, so as to respectively deliver twine to a plurality of tying devices including respective knotter gears 44 mounted to a knotter shaft 46 extending across the top of the baling chamber 38. A supply of twine for delivery by the needles is provided in the form of balls of twine contained within twine storage boxes 48 provided along opposite sides of the baler 10.

Integrated into the structure of the baler 10 is a crop re-hydration system 50 including a steam generator assembly 52 comprising a steam generator body 65 supported at an upper rear region of the baling chamber 38. The steam generator body 54 has an interior which defines a combustion chamber and comprises a major cylindrical section to which a cylindrical burner-head 56 is coupled, and a conical outlet section to which one end of a compound elbow 58 is coupled, the other end of the elbow being coupled to a primary steam distribution tube 60 extending fore-and-aft above the right-hand twine storage boxes 48, with a static mixer (not shown) being provided in a section 62 of the tube 60 which is adjacent the elbow 58. A forward end of the steam distribution tube 60 is coupled to a primary steam distribution manifold 64 defined by a down-turned section of the tube 60 located in a region forward of the front twine box 48. A first steam distribution conduit 66 is coupled between the bottom of the distribution manifold 64 and a manifold 68 of an upper front steam inject ion manifold assembly 70 disposed beneath, and secured to the draft frame 18 of the baler 10 at a location above a forward portion of the tined reel 30 of the pick-up 26. A lower front steam injection manifold assembly 72 includes a manifold 74 mounted across a lower rear region of the pick-up 26 and a second steam distribution conduit 76 is coupled between the distribution manifold 64 and the injection manifold 74 of the manifold assembly 72. A third steam distribution conduit 78 is coupled at one end to the distribution manifold 64, at a location above the second conduit 76, and has another end coupled to a manifold (not shown) of a third steam injection manifold assembly 80, incorporated in a stripper band arrangement for the stuffer fork 40. Associated with the conduit 78 is a remotely controlled steam control valve 81 which is selectively shut off when the baler 10 is being operated in the headland of a field where no hay is being picked up but with steam still being supplied to the various steam injection manifolds. The need for shutting off the flow of steam to the manifold assembly 80 is to prevent over-steaming hay that is collected within the pre-compression chamber 36.

Figure 2:
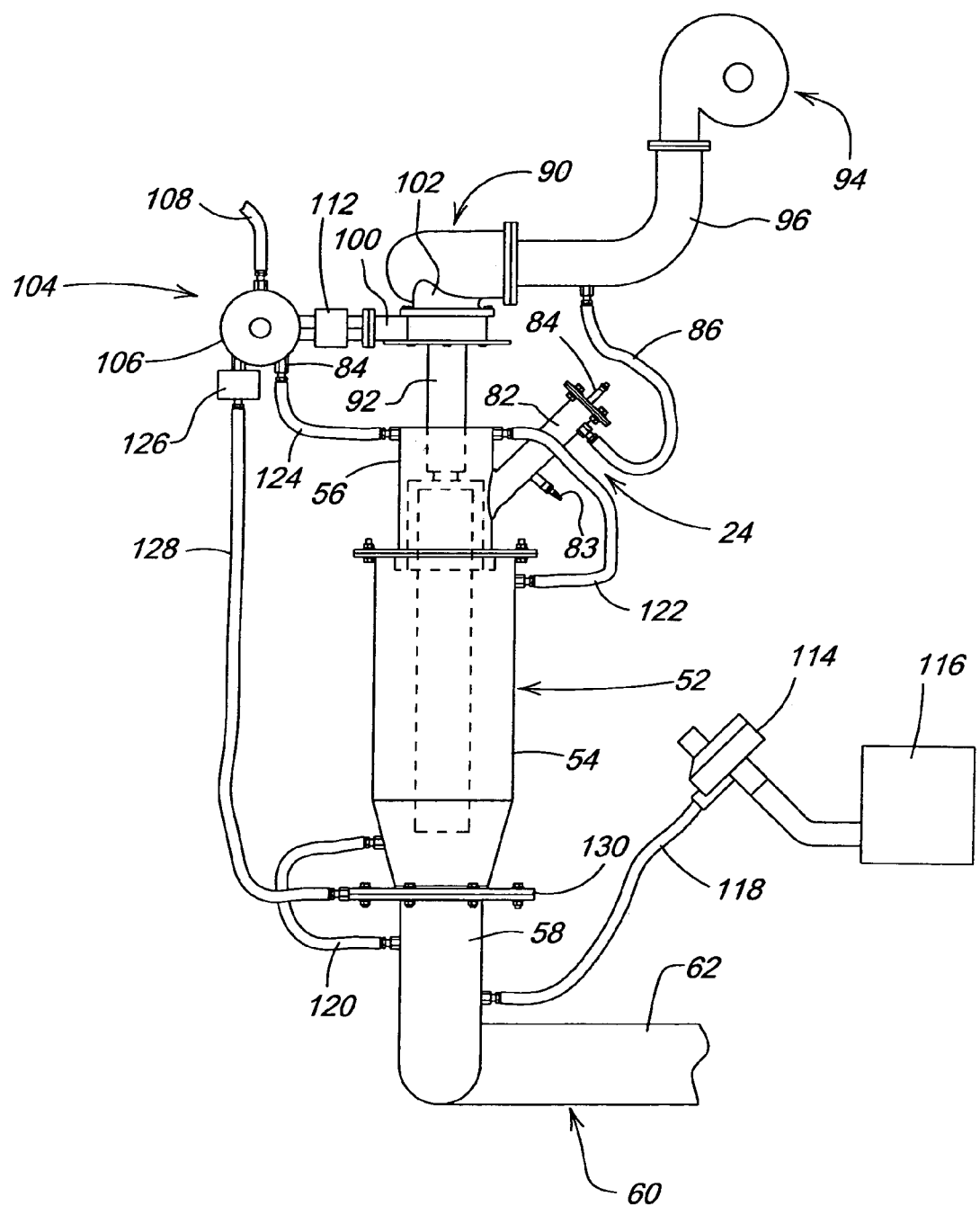
FIG. 2 is a top view, with parts omitted for simplicity and others slightly rearranged for convenience, of the direct-fired steam generator of the crop re-hydration system.

Referring now also to FIG. 2, it can be seen that the burner-head 56 has a pilot burner arrangement including a tube 82 coupled to it so as to project through, and terminate at, an interior surface of a lower region of the burner-head 56. An igniter 83, which may be a spark plug or other type of sparking device, is mounted to the tube 82 so as to be positioned to selectively create a spark at an interior location of the tube 82 for igniting a fuel/air mixture resulting when vaporized fuel enters by way of a pilot fuel line 84 coupled to an inlet provided in a cover at an end of the tube 82, and when air enters by way of a pilot burner air line 86 coupled to a location of the tube 82 adjacent the cover.

A carburetor 90 has an outlet coupled to an inlet end of the burner-head 56 by a short tube 92. Coupled between a main combustion air inlet of the carburetor 90 and an outlet of a variable output, air pump arrangement 94, which includes a hydraulic motor (not visible), is a combustion air supply conduit 96, with the inlet of the air pump arrangement 94 being coupled to an air cleaner 98 by a short clean air supply conduit (not visible). The carburetor 90 also has a main combustion fuel inlet 100 coupled to an outlet end of a throttle body 102 of the carburetor 90.

A fuel converter assembly 104 includes a pair of interconnected fuel converter bodies 106 (only one shown). Each converter body 106 has a liquid fuel inlet coupled by a fuel line 108 to a propane tank 110, which is carried on an upper rear region of the baling chamber 38. Each converter body 106 includes a gaseous fuel outlet, which is coupled, by way of a manifold 112 to the combustion fuel inlet 100 of the carburetor 90. A water conduit section (not shown) is located in the converter assembly 104 in heat transfer relationship to the liquid fuel located in the converter assembly and carries hot water for imparting heat to liquid propane that enters the converter assembly 104, by way of the fuel line 108, so as to convert the liquid propane to gaseous propane which exits the converter assembly 104 and flows into the carburetor 90 by way of the manifold 112.

Process water, used for forming the steam generated in the steam generator body 44, is first routed into serially connected water jackets respectively of, and for cooling, the elbow 58, generator body 54 and burner-head 56, and then to the converter assembly 104, for heating and changing to gas, the liquid propane that enters the fuel converter assembly 104. This process water is supplied by a water pump 114 coupled for drawing water from a pair of interconnected water tanks 116 respectively located beneath the twine boxes 48 at the opposite sides of the baler 10 and at respective locations centered above the tandem wheels 14, with only the right-hand water tank 116 being visible. The water pump 114 has an outlet coupled to the water jacket of the elbow 58 by a supply conduit 118. A first bridging conduit 120 is coupled between the water jacket of the elbow 58 and the water jacket of the steam generator body 54, while a second bridging conduit 122 is coupled between the water jackets respectively of the generator body 54 and the burner-head 56. The burner-head water jacket is provided with an outlet coupled to an inlet of the fuel converter assembly 104 by a hot water feed conduit 124. This process water flows out of the converter bodies 106 of the fuel converter assembly 104 into a manifold 126, and from there into a connecting conduit 128 that leads to a water injection device (not visible) contained in a flange joint 130 between the elbow 58 and the generator body 54, which injects water into hot combustion gases so that the water is turned into steam. It is noted that initially only some of the water is turned into steam but as the remaining water becomes more thoroughly mixed with the hot gases by the static mixer contained within the conduit section 62, and also during traveling along the primary steam delivery conduit 60, it too becomes steam so that only steam is present in the manifold 64.

Thus, it will be appreciated that the crop re-hydration system 50 is integrated into the baler 10 in a manner that does not increase the overall dimensions of the baler 10. Further by placing the direct-fired steam generator assembly 52 at the rear of the baling chamber 38, it is removed from the source of hydraulic fluid that supplies the pump assembly 24 at the front of the baler so that heat is not rejected into the hydraulic fluid. The placement of the combustion air cleaner 98 and air pump arrangement 94 at an upper rear location of the baler 10 has the advantages of being in a relatively clean location which is close to the carburetor 96 so that only a minimum of "plumbing" is required for connecting the inlet of the pump arrangement 94 to the air cleaner 98, and for connecting the outlet of the pump arrangement 94 to the carburetor 90. It is possible to mount the air pump arrangement 94, which is driven with a hydraulic motor, at the front of the baler 10 so as to be in close proximity to the source of hydraulic fluid supplied by the pump assembly 24, in which case, it might also be desirable to mount the air cleaner. With the pump arrangement 94 located at the front of the baler 10, it may also be desirable to mount the air cleaner 98 at an elevated location at the front of the baler so as to be in a relatively clean location. While such an arrangement, as compared to the illustrated arrangement, has the drawback of requiring relatively long conduits to conduct clean air to the pump arrangement 94 and to conduct compressed air to the carburetor 90, it has the advantage of requiring only a short conduit for coupling hydraulic fluid to the hydraulic pump drive motor.

Another possible variation of the present invention from the illustrated embodiment could be that, instead of the water tanks 116 extending beneath relatively short twine boxes 48, and over and about upper surfaces of the tandem wheels 14, each water tank 116 could be replaced by a generally T-shaped water tank wherein the stem is relatively wide in the fore-and-aft direction so as to span a distance between center top locations of the wheels 14. The twine boxes 48 would be reconfigured to include front and rear boxes respectively located against front side and rear sides of the stem of the adjacent water tank. The head of the water tank would extend over at least a portion of the top of the front and rear twine boxes. Further, because of the additional height of the twine boxes and of the height of the water tank, the steam distribution conduit 60 would be located in the same plane with the steam generator body 54 and extend over the top of the water tank at the right-hand side of the baler.

It is to be noted that the vertical disposition of the steam distribution manifold 64 has the advantage of directing any solid particles, which may have been left when the water flashed to steam, and/or water droplets, which may have formed in the main distribution conduit 60 due to condensation after turning the crop re-hydration system 50 off, through the steam distribution conduit 66 coupled at the bottom of the manifold 64. While these solid particles are of concern if they find their way into steam control valves, no such valve is associated with the conduit 66 and the particles are merely deposited on the ground or on the crop being baled. Because the steam injection manifold 68 is located forwardly of the pick-up 26, water droplets are blown out of the injection manifold 68 and onto the ground during start up of the re-hydration system 50. Once all of the water has been purged from the system, baling may commence, it being noted that starting to bale before purging the system of water could have a deleterious effect on the quality of the baled hay since spoilage may occur at the site where the droplets are deposited.

If it is desired to equip the steam distribution conduit 66 with a steam control valve, instead of having the conduit 66 coupled to the bottom of the steam distribution manifold 64, it may be desirable to place the conduit at a location above the bottom of the manifold 64 and to cap off the bottom of the manifold 64 with a removable cap for collecting solids which may be removed to clean out the solids and to permit condensed moisture to be purged during start up.

Having described the preferred embodiment, it will become apparent that various modifications can be made without departing from the scope of the invention as defined in the accompanying claims.

The invention claimed is:

1. In a combination of a baler for making large, parallelepiped bales, and a crop re-hydration system for re-hydrating crop to be baled, wherein said baler includes a main frame supported on a wheel assembly including an axle assembly supported by said frame, a fore-and-aft extending baling chamber having a crop inlet in an underside of a forward region thereof, a plunger mounted at a forward end of said baling chamber for reciprocating within the chamber so as to selectively traverse said crop inlet, a pick-up mounted to a forward end of said baler for picking up and delivering a windrow of crop to a curved chute defining a pre-compression chamber and having an outlet coupled to said crop inlet, the improvement comprising: said crop re-hydration system including a direct-fired steam generator mounted to a rear region of said baling chamber of said baler and including a combustion chamber; a source of fuel and a source of combustion air being coupled to said combustion chamber so as to enter said combustion chamber as a combustible mixture; a main steam conduit being coupled to said combustion chamber and extending to a forward location of said baler; a steam distribution manifold being located at said forward location on said baler and coupled to a forward end of said main steam conduit; a source of process water being coupled for being injected into said combustion chamber for contact with combustion gases for changing the injected water into steam; and said main steam conduit having a length between said combustion chamber and said steam distribution manifold which is sufficient for the injected water to become thoroughly mixed with hot combustion gases and completely changed to steam prior to reaching said steam distribution manifold.

2. The combination, as defined in claim 1, wherein said combustion chamber of said steam generator extends transversely across a top surface of said baling chamber of said baler.

3. The combination, as defined claim 1, wherein said source of water is contained in first and second tanks located at opposite sides of said baler approximately vertically above said axle assembly.

4. The combination, as defined in claim 1, wherein said source of fuel is contained in a fuel tank extending transversely across, and mounted to, a top surface of said baler at a location rearward of said combustion chamber of said steam generator.

5. The combination, as defined in claim 1, wherein said source of combustion air is supplied by an air pump mounted to said baler and having an inlet coupled to a combustion air filter positioned above sad air pump at an elevation approximately equal to that of an upper most part of said baler.

6. The combination, as defined in claim 5, wherein said air pump is mounted in a region closely adjacent said combustion chamber of said steam generator.

7. The combination, as defined in claim 6, wherein said air filter is mounted in a region closely adjacent said air pump.

8. The combination, as defined in claim 1, wherein said baler has twine storage boxes located at opposite sides of said baler, and said main steam conduit extending forwardly across the top of twine boxes at one side of said baler.

9. The combination, as defined in claim 1, wherein a steam injection manifold assembly is mounted to said baler at a location for injecting steam forward of said crop pickup; said steam distribution manifold being disposed substantially vertically, and a steam distribution conduit being coupled between a lower end of said steam distribution manifold and said steam injection manifold assembly, whereby any water which may have condensed within said main steam conduit may be collected within said steam distribution manifold and discharged upon the ground by way of said steam distribution conduit and said steam injection manifold assembly during start up of said re-hydration system.

* * * * *